United States Patent [19]

Schembri

[11] Patent Number: 5,599,411
[45] Date of Patent: *Feb. 4, 1997

[54] METHOD AND DEVICE FOR ULTRASONIC WELDING

[75] Inventor: Carol Schembri, San Mateo, Calif.

[73] Assignee: Abaxis, Inc., Sunnyvale, Calif.

[*] Notice: The term of this patent shall not extend beyond the expiration date of Pat. No. 5,403,415.

[21] Appl. No.: 350,856

[22] Filed: Dec. 6, 1994

Related U.S. Application Data

[62] Division of Ser. No. 154,222, Nov. 17, 1993, Pat. No. 5,403,415.

[51] Int. Cl.[6] ................................................. B32B 31/16
[52] U.S. Cl. ..................... 156/73.1; 156/580.2; 264/445
[58] Field of Search .............................. 156/73.1, 73.4, 156/580.1, 580.2, 581, 625.1; 264/23, 442, 443, 445

[56] References Cited

U.S. PATENT DOCUMENTS

| | | | |
|---|---|---|---|
| 3,602,257 | 8/1971 | Berleyoung et al. | 156/73.1 X |
| 3,814,656 | 4/1974 | Hanson et al. | 156/380 |
| 3,912,576 | 10/1975 | Braun | 156/580.2 |
| 3,993,532 | 11/1976 | McDonald et al. | 156/580 |
| 4,374,697 | 2/1983 | Tsuzuki et al. | 156/580.2 |
| 4,430,148 | 2/1984 | Schaefer | 156/580 |
| 4,499,845 | 2/1985 | Pope | 116/137 |
| 4,545,519 | 10/1985 | Renshaw et al. | 228/1.1 |
| 4,618,516 | 10/1986 | Sager | 428/35 |
| 4,690,722 | 9/1987 | Flood | 156/510 |
| 4,729,778 | 8/1988 | Griffin | 65/36 |
| 4,757,933 | 7/1988 | Hawkins et al. | 228/110 |
| 4,769,095 | 9/1988 | Sager | 156/69 |
| 4,786,356 | 11/1988 | Harris | 156/580 |
| 4,795,511 | 1/1989 | Wouters et al. | 156/73.1 |
| 4,838,964 | 6/1989 | Thomsen et al. | 156/73.1 |
| 4,904,319 | 2/1990 | Divincenzo et al. | 156/73.4 |
| 4,909,871 | 3/1990 | Todo et al. | 156/73.1 |
| 4,975,133 | 12/1990 | Gochermann | 156/73.1 |
| 5,073,216 | 12/1991 | Siegel et al. | 156/73.3 |
| 5,403,415 | 4/1995 | Schembri | 156/73.1 |

*Primary Examiner*—James Sells
*Attorney, Agent, or Firm*—Townsend and Townsend and Crew LLP

[57] ABSTRACT

A method and a device for modifying the energy-applying surface of an ultrasonic welding horn to join two complex thermoplastic parts by applying a thin film to the surface of the horn is disclosed. The thin film is applied to insure that a proper weld occurs along a complex and intricate pattern of energy directors located between the parts.

10 Claims, 5 Drawing Sheets

METHOD AND DEVICE FOR ULTRASONIC WELDING

This is a division of application Ser. No. 08/154,222 filed Nov. 17, 1993, U.S. Pat. No. 5,403,415.

BACKGROUND OF THE INVENTION

1. Field of the Invention

The present invention relates generally to a method and a device for modifying an ultrasonic welding horn, and more particularly to a method of modifying the horn to more effectively weld complex thermoplastic parts using ultrasonic welding technology.

Ultrasonic welding of thermoplastic parts is accomplished by creating high frequency vibrations from an ultrasonic welding horn which contacts a surface of the parts being assembled. The vibrations cause surface and intermolecular friction between the parts which produces a sharp rise in temperature at the joints where the parts meet. The rise in temperature becomes great enough to then melt the plastic causing a flow of plastic between the parts. After cessation of the vibration, the material solidifies and a weld results.

In order to make this process more efficient, triangular ridges called energy directors are usually formed on one of the parts are created to contact an adjacent flat area of the other part. Since these energy directors are in direct contact with the other part (leaving a majority of the adjacent surface areas out of contact), they readily become molten when the horn is vibrated causing welds to be localized to the areas of the energy directors.

One problem associated with such ultrasonic welding processes is that when using precision parts having a number of energy directors, certain areas do not receive enough energy from the horn and are thus under-welded. Conversely, other areas receive too much energy resulting in an excess of plastic flow in undesirable areas. In particular, such uneven welding may occur when combining two circular parts with energy directors located at the periphery of the parts. The peripheral location causes a concentration or amplification of the ultrasonic energy which can cause excess plastic flow. If the total energy delivered to the parts is reduced to eliminate the excess plastic flow, there will frequently be insufficient energy delivered to the interior of the parts necessary to effect welding.

Of particular interest to the present invention are circular analytical rotors used for blood analysis having a plurality of cuvettes around their periphery. Often, the energy directors located at the periphery can receive too much energy resulting in plastic flowing into the cuvettes. This is a serious problem since excess and/or uncontrolled amounts of plastic on the interior of the cuvette will impact the effective light path observed in making spectrophotometric analyses with the rotors.

Under-welding of analytical rotors can occur in the interior regions of the rotor having a high density of energy directors. If total energy delivered to the rotor is limited (e.g. to avoid over-welding the periphery), insufficient energy may reach the interior energy directors, causing the interior of the rotor to be under-welded. Consequently, the fluid paths of the resulting molded part may not be sufficiently welded.

For these reasons, it would be desirable to provide improved methods and apparatus for ultrasonic welding of thermoplastic parts. The method and apparatus should provide for uniform welding of energy directors over the entire surface of a thermoplastic part. In the case of analytical rotors and other circular parts, the method and apparatus should eliminate the problem of over-welding at the periphery, thus insuring a proper light path through the cuvettes in the case of analytical rotors. The method and apparatus should also help insure that areas of the molded parts having a high density of energy directors are sufficiently welded in order to promote proper creation of fluid paths, even when welding at the periphery is not problematic. It would further be desirable if such methods and apparatus were easy to implement and compatible with existing ultrasonic welding techniques and equipment. Particularly, it would be desirable to provide for a simple and inexpensive means to alter the existing ultrasonic horn to obtain the desired uniform welding between the parts.

2. Description of the Background Art

U.S. Pat. No. 4,769,095, describes a method of closing an open ended thermoplastic body with a thermoplastic sheet material through the use of an ultrasonic horn having a cylindrical protrusion extending from its base. This protrusion is used to enter a groove in the thermoplastic body in order to force the sheet material into the groove. After the horn is entered in the groove, the horn is vibrated to achieve a weld within the groove.

U.S. Pat. No. 4,499,845, discloses an ultrasonic horn having a detachable/replaceable end portion which defines the welding surface.

U.S. Pat. No. 4,618,516 describes a method for ultrasonically joining two workpieces having energy directors located on one surface, with an adjacent surface being roughened.

U.S. Pat. No. 4,545,519, teaches the use of a thin metallic "shim" having a hardness greater than that of the workpiece placed over the horn to prevent the horn from sticking to the workpiece.

U.S. Pat. No. 4,430,148, which is typical of several similar patents, discloses the welding of target areas by placing anvils having protuberances behind the materials to be welded.

See also U.S. Pat. Nos. 4,975,133; 4,786,356; 4,757,933; 4,729,778; 4,690,722; 4,729,778; 3,993,532; and 3,814,656, which are related to various aspects of ultrasonic welding.

SUMMARY OF THE INVENTION

According to the present invention, improved methods and apparatus are provided for the ultrasonic welding of thermoplastic parts. Such methods and apparatus provide for the modification of an ultrasonic welding horn to provide for uniform welding of two thermoplastic parts.

In a broad aspect of the invention, a horn comprises a resonant mass of material having a planar energy-applying surface. The surface is modified by forming at least one coplanar region over a planar base, wherein the coplanar region is raised relative to the base by a distance in the range from about 0.0005 inches to 0.025 inches, preferably from about 0.001 inches to 0.002 inches. The modified horn may be used in a welding process according to the present invention by contacting the energy-applying surface against a first thermoplastic part which is positioned so that it contacts a pattern of energy directors on a second thermoplastic part. The modified energy-applying surface is then resonated to deliver ultrasonic energy to the first thermoplastic part for a time sufficient to melt thermoplastic material in each part in a pattern determined primarily by the geometry of the energy directors.

As discussed in the background above, use of a flat energy-applying surface can result in uneven welding of the thermoplastic parts to be joined, i.e., some regions can be "over-welded" resulting in excess plastic flow and other regions can be "under-welded" resulting in inadequate bonding. In order to promote uniform welding of the thermoplastic parts, the raised coplanar region(s) of the energy-applying surface of the ultrasonic horn will be formed in a pattern which affects energy transmission from the horn to the parts in a manner which lessens over-welding and/or reduces underwelding. In particular, target areas on the first thermoplastic part are identified where over-welding i.e., excess plastic flow, occurs. The raised surface is patterned to avoid contact with these areas, allowing more energy to be delivered to under-welded areas where direct contact is maintained. In some cases, it will be desirable to have certain coplanar regions which are raised higher than others in order to further focus energy at regions needing more energy, e.g. regions with a high density of energy directors. For example, when welding an analytical rotor comprising two circular parts having cuvettes located at the periphery, the raised surface may be patterned to avoid contacting the periphery. The interior may be further patterned to have higher raised surfaces to contact areas with a high density of energy directors.

In a first particular aspect of the present invention, the raised coplanar surface(s) is formed by applying a preformed film to the energy-applying surface of the horn. Preferably, the film is cut or otherwise patterned from a sheet of material that is then laminated to the energy-applying surface of the horn. Conveniently, the film can have an adhesive surface which then can be attached to the energy-applying surface of the horn. Typically, this is done by properly aligning the patterned film on a contact area of the first thermoplastic part, with the adhesive side of the film facing the energy-applying surface of the horn. The horn is then lowered until it contacts the adhesive side of the film.

The film material can be composed of any material which has the requisite thickness and which can transmit energy between the horn and the parts being welded. Exemplary materials include plastic films, metal foils, and the like. Preferred are films composed of a thermosetting plastic which will withstand (avoid melting and rapid degradation) the ultrasonic energy such as polyesters. Suitable thermoplastic materials which can also withstand the ultrasonic energy include polyethylene, polyvinyl chloride, and the like. Successive layers of film (of the same or different thicknesses) can be applied to the horn in order to provide for coplanar regions which are raised by different distances.

Alternatively, a film may be applied to the energy-applying surface of the horn to obtain the raised surface by any one of numerous film deposition techniques including chemical vapor deposition (CVD), deposition from solution, vacuum deposition techniques, e.g. sputtering, deposition from gaseous discharge, and the like.

In a second particular aspect of the method of the present invention, the horn may be modified by etching a pattern in the energy-applying surface whereby the non-etched (or partially etched) portions of the surface define the raised surface(s) used to enhance the energy direction. Such etching may be accomplished by a wet chemical process, by dry plasma etching, by mechanical means, e.g. abrasion, electro discharge machining (EDM), machining, or the like.

Apparatus according to the present invention include an ultrasonic horn comprising a resonating mass of material having an energy-applying surface with a planar base and at least one coplanar region that is raised relative to the base. This region is raised from about 0.0005 inches to 0.025 inches relative to the base. The horn may further comprise additional coplanar region(s) that are raised to a different distance relative to the base preferably from about 0.0005 inches to 0.005 inches. As discussed above, the purpose of the raised surface(s) is to enhance the transfer of ultrasonic energy to the thermoplastic parts to be welded together.

In a particular aspect of the apparatus, a first raised surface may be located over a central portion of the horn so that it contacts a central region of the part to be welded, e.g. a region which is spaced radially inward from the periphery. Thus, over-welding of energy directors located at or near the periphery of a thermoplastic part can be lessened. A second raised surface may also be used to lessen or avoid under-welding of interior portion(s) of the part to be welded. Under-welding often occurs in areas having a high density of energy directors. By providing the second raised surface (raised higher than the first raised surface relative to the base) additional energy can be transferred to those areas which have more material to be melted, e.g. areas with a high density of energy directors. Additional raised surfaces may also be provided to further tailor the energy directing properties of the horn.

An exemplary and preferred embodiment of the ultrasonic horn of the present invention includes a film that is attached to the planar base of the energy-applying surface of the horn to form the raised coplanar region. More preferably, the film will comprise at least one preformed thermosetting polymer sheet which has been pre-cut into a desired shape and laminated to the energy-applying surface. Suitable thermosetting and thermoplastic polymer materials include polyesters, polyethylenes, polyvinyl chloride, and the like. The use of a preformed plastic sheet is desired because of the ease of shaping, application, and adaptability to existing ultrasonic welding technology. For example, the film may be cut from a piece of polyester having an adhesive surface. This may then be applied to the horn by placing it in contact with the horn, as described above.

A second exemplary embodiment of the ultrasonic horn will include an inorganic thin film vapor that has been deposited over the planar base of the energy-applying surface of the horn to create the raised surface. This film may be deposited on the base of the horn by the film deposition techniques discussed above.

A third exemplary embodiment of the ultrasonic horn will include a coplanar raised region that is created by etching the energy-applying surface of the horn to remove material to defined the planar base. Methods for this process are also discussed above.

A method for joining the two thermoplastic workpieces is also provided. According to this method, two thermoplastic workpieces are positioned so that a pattern of energy directors on the surface of the second workpiece is in contact with a surface of the first workpiece, or vice versa. An ultrasonic horn that has been modified so that is contains a raised coplanar region relative to the planar base of the horn (as described above) is then contacted against the first thermoplastic workpiece. The horn is then resonated to deliver ultrasonic energy to the first thermoplastic workpiece for a time sufficient to melt thermoplastic material in each workpiece in the pattern of the energy directors. Resonating of the horn is then stopped, and the melted thermoplastic material in each workpiece is allowed to solidify to form a weld. To assist in this process, the thermoplastic pieces can be placed together and placed on a support surface to hold the workpieces when the horn is lowered to apply a compressive force. The applied force and time varies widely as in known in the art.

In a further aspect of this invention, articles of manufacture are formed by any of the methods of manufacture described above.

DESCRIPTION OF THE PREFERRED EMBODIMENT

Figure 1:
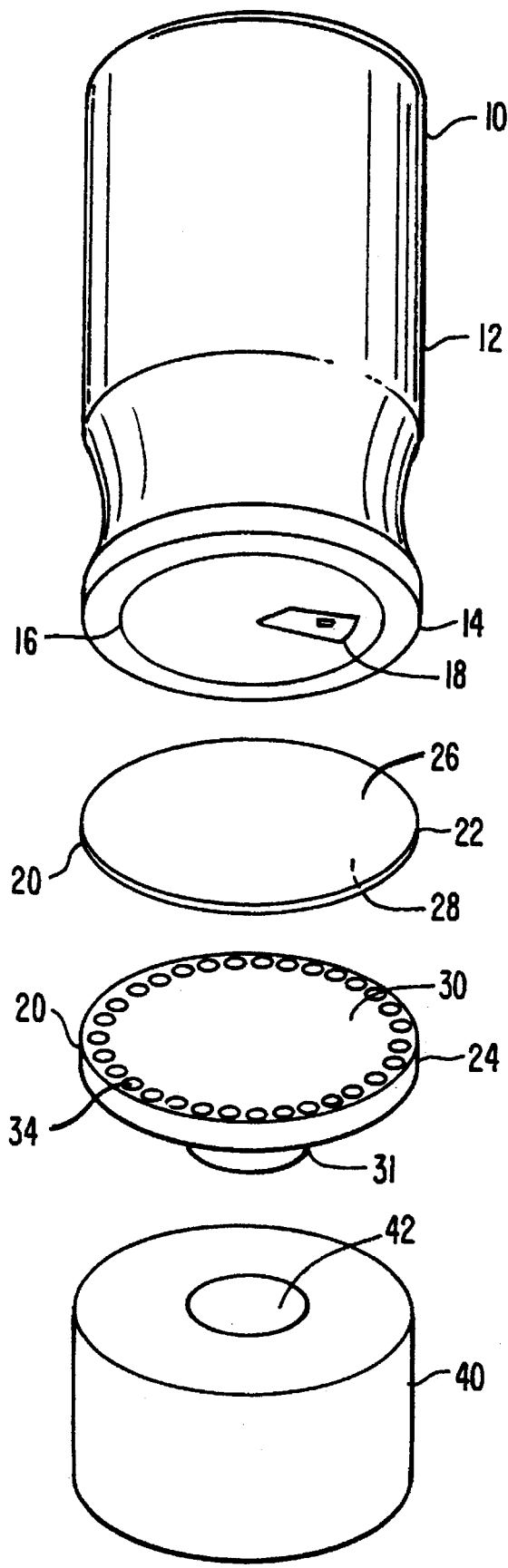
FIG. 1 is a perspective view of an ultrasonic horn modified according to the present invention, an analytical rotor according to the present invention, and a nest where the analytical rotor is to be placed when welded according to the method of the present invention.

The method and apparatus of the present invention are useful for welding together two or more thermoplastic parts, particularly parts having complex patterns of energy directors and critical dimensional requirements that can be adversely affected by plastic flow caused by over-welding. The method and apparatus are used in conjunction with an ultrasonic welding machine having a flat-surfaced horn, whereby the ultrasonic welding machine is able to deliver ultrasonic energy to the horn. The ultrasonic welding machine also generally allows parts that are to be welded to be secured in a holding device, referred to as a nest, to insure that the thermoplastic parts will be positioned correctly when the horn is lowered to apply ultrasonic energy as well as to allow a compressive force to be applied to the parts. An exemplary ultrasonic welding machine is the Branson 900M series manufactured by Branson Ultrasonic Corporation, Danbury, Conn. The Branson 900M ultrasonic welder has a power supply to provide power which is then converted to vibratory or mechanical energy by a converter. The converter is coupled to the horn by a booster which is a resonant half-wave metal device that is designed to resonate at the same frequency, typically 20 kHz, as the converter it is to be used with. The booster and horn used together then determine the amplitude vibration that is produced at the surface of the horn. The horn is lowered and placed over the thermoplastic part by a pneumatic system. The purpose of the flat surfaced horn is then to transfer this energy to the thermoplastic parts to be welded and to apply the necessary force in order to achieve the weld. While illustrated in connection with the Branson 900M welding it will be appreciated that the methods of the present invention can be used to modify flat surface(s) on ultrasonic welding horns of virtually any available ultrasonic welder.

The methods of the present invention rely on modifying the energy-applying surface of the ultrasonic welding horn to enhance a proper weld. Three general ways are available for modifying the surface of the horn. These are etching, film deposition techniques, and preferably attaching preformed and prepatterned sheet(s) of material on the surface of the horn.

Etching the surface of the horn can be accomplished by a wet chemical process, by dry plasma etching, or by mechanical removal of material. Wet chemical etching utilizes chemical reactivity with an etchant of the material to be etched. With plasma etching, a plasma is formed above a masked surface that is to be etched by contributing large amounts of energy to a gas at low pressures. The plasma contains neutral spaces, free radicals, and ions, with high kinetic energies. When the electrical potential of the substrate to be etched is altered, the charged species in the plasma may be directed to impact the nonmasked regions by impinging on the substrate. Etching by mechanical means can be performed by high precision machining of the base of the horn to mechanically remove material from the base to create the desired raised surface. Such techniques are well known in the art and need not be described further.

Numerous film depositing techniques are available for modifying the surface of the horn including: deposition of films from solution, vacuum deposition techniques, and deposition of films in gaseous discharge, and deposition of films at atmospheric pressure as taught in "Film Deposition Techniques," *Encyclopedia of Chemical Technology*, by Kirk-Othmer, 3rd ed, vol. 10, pp. 247–270. In one example of the vacuum deposition, evaporation plating, inorganic materials are evaporated to create the raised surface. In this process, a thin film of material is deposited by vaporization in a vacuum. This is accomplished by heating an inorganic material until it is evaporated. A mask is also placed on the desired pieces defining the areas of deposition. The vaporized material may then be directly applied as a thin film on the desired surface.

The preferred method of modifying the surface is by attaching one or more preformed and prepatterned, e.g. precut, thin sheet(s) of material on the surface of the horn to obtain the desired raised coplanar region(s). Such thin sheets will usually be flat with a thickness of 0.0005 inches to 0.0250 inches, preferably 0.0010 inches to 0.0020 inches. Alternatively, a plurality of thin sheets having the same periphery may be built up in order to obtain the desired thickness of a raised coplanar region.

The sheet(s) may be joined together or attached to the surface of the horn in any manner. Preferably, a self-adhesive is used because of the ease in applying it to the surface of the horn as well as to other sheets of material. Specifically, the use of a self-adhesive provides for a simple and inexpensive method to insure that the sheets are placed in the correct position on the surface of the rotor. Correct positioning can be accomplished by placing the non-adhesive side of the material on a target area of the thermoplastic part to be welded. The raised coplanar regions will be properly aligned with those regions on the parts to be welded. The ultrasonic horn (unpowered) is then lowered until it contacts the adhesive side of the film. The horn can then be raised, and the sheet smoothed, typically by hand, to insure that no air cavities exist between the sheet and the surface of the horn.

The sheets are patterned to build up the energy-applying surface so that energy is transferred more directly to those areas which require it and less to the areas subject to over-welding. Surprisingly, it has been found that the very thin plastic sheets of the preferred embodiment will enhance energy transfer in those areas where it is applied, while providing lesser energy transfer in other areas. Thus, by providing raised coplanar regions of differing thickness, the delivery of energy can be modified within a range or spectrum that provides for desired levels of welding at different areas. As a general rule, raised coplanar regions will be formed away from the periphery of the parts to be joined (where energy transfer is often concentrated) and at areas having a high density of energy directors. As the amount of energy transferred appears to vary directly with the distance which the coplanar region is raised, it will usually be desirable to provide the highest coplanar regions in the areas with the highest concentrations of energy director's.

Figure 2:
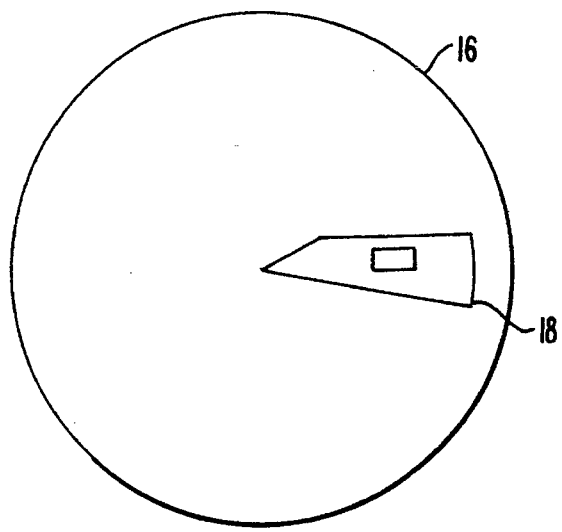
FIG. 2 is a plan view of a preformed plastic film that can be used to direct ultrasonic energy according to the method of the present invention.
Figure 3A:
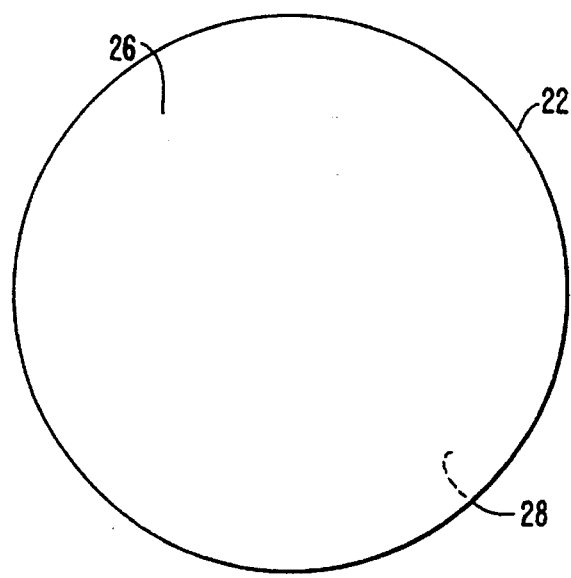
FIGS. 3A and 3B are plan views of the two surfaces of thermoplastic parts to be welded together to form an analytic rotor.
Figure 3B:
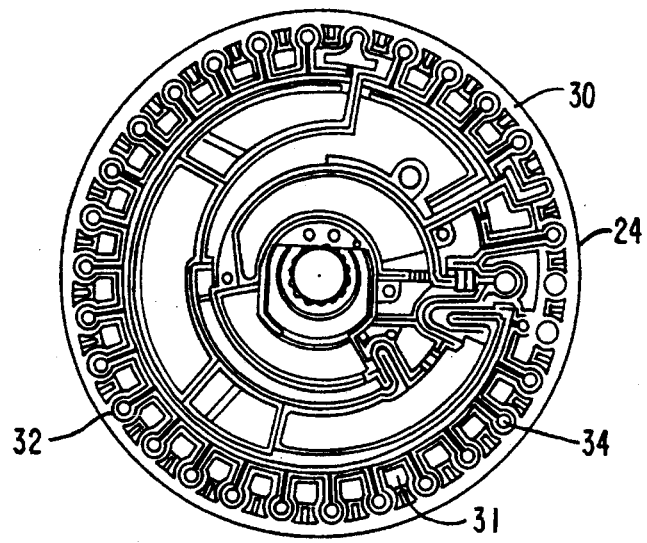

Referring now to FIGS. 1 and 2, an exemplary embodiment of the modified ultrasonic horn 10 constructed in accordance with the principles of the present invention will be described. The modified ultrasonic horn 10 is intended for welding a plastic cover 22 (FIG. 3A) over a plastic base to build an analytical rotor, as described in more detail hereinafter, and comprises a rigid body 12 having a planar energy-apply surface 14 located at its base. Attached to the energy-applying surface 14, as discussed above, is a first raised coplanar region 16. This first coplanar region 16 is formed from a sheet of material, typically being composed of precut thermosetting plastic or thermoplastic material which will withstand ultrasonic energy such as such as polyethylene, polyester, polyvinyl chloride, and the like. A second coplanar region 18 composed of a thermosetting plastic, is also attached either to the energy-applying surface 14 or to the first coplanar region 16 as discussed above.

In a preferred aspect of the invention, useful for fabricating analytical rotors, the first coplanar region 16 will be circular having a diameter less than the diameter of the energy-applying surface 14. The first coplanar region 16 will consist of a polyester film that is cut from a sheet of polyester material, and will have a thickness from about 0.001 inches to 0.002 inches as shown in FIG. 2. The first coplanar region 16 will also have a self-adhesive on one of its sides to enable it to be attached to the energy-applying surface 14. The second coplanar region 18 has a geometry that is generally pie shaped and is composed of polyethylene having a thickness from about 0.0005 inches to 0.0010 inches. The second coplanar region 18 is attached to the first coplanar region 16 by the use of a self-adhesive on one side of the second coplanar region 18 such that the second coplanar region 18 is located 0.0015 inches to 0.003 inches relative to the energy-applying surface 14.

Referring now to FIGS. 3–6, an analytic rotor will be described in order to further discuss the particular geometries of the first coplanar region 16 and the second coplanar region 18. The analytical rotor comprises a first thermoplastic part (cover) 22 and a second thermoplastic part (base) 24 which are composed of a thermoplastic material composed of polymethyemethacrylate. The cover 22 is circular having two generally flat surfaces as shown in FIG. 3A. The top surface 26 is designed to contact the energy applying surface 14 of the horn while the bottom surface 28 is designed to contact the base 24. The base 24 also has a top surface 30 and a bottom surface 31, as shown in FIG. 3B. A pattern of energy directors 32 are formed over the top surface 30 of the base 24 and 32 are designed to contact the bottom surface 28 of the cover 22. In the welding process, the energy directors will melt to form the desired welds.

Figure 4:
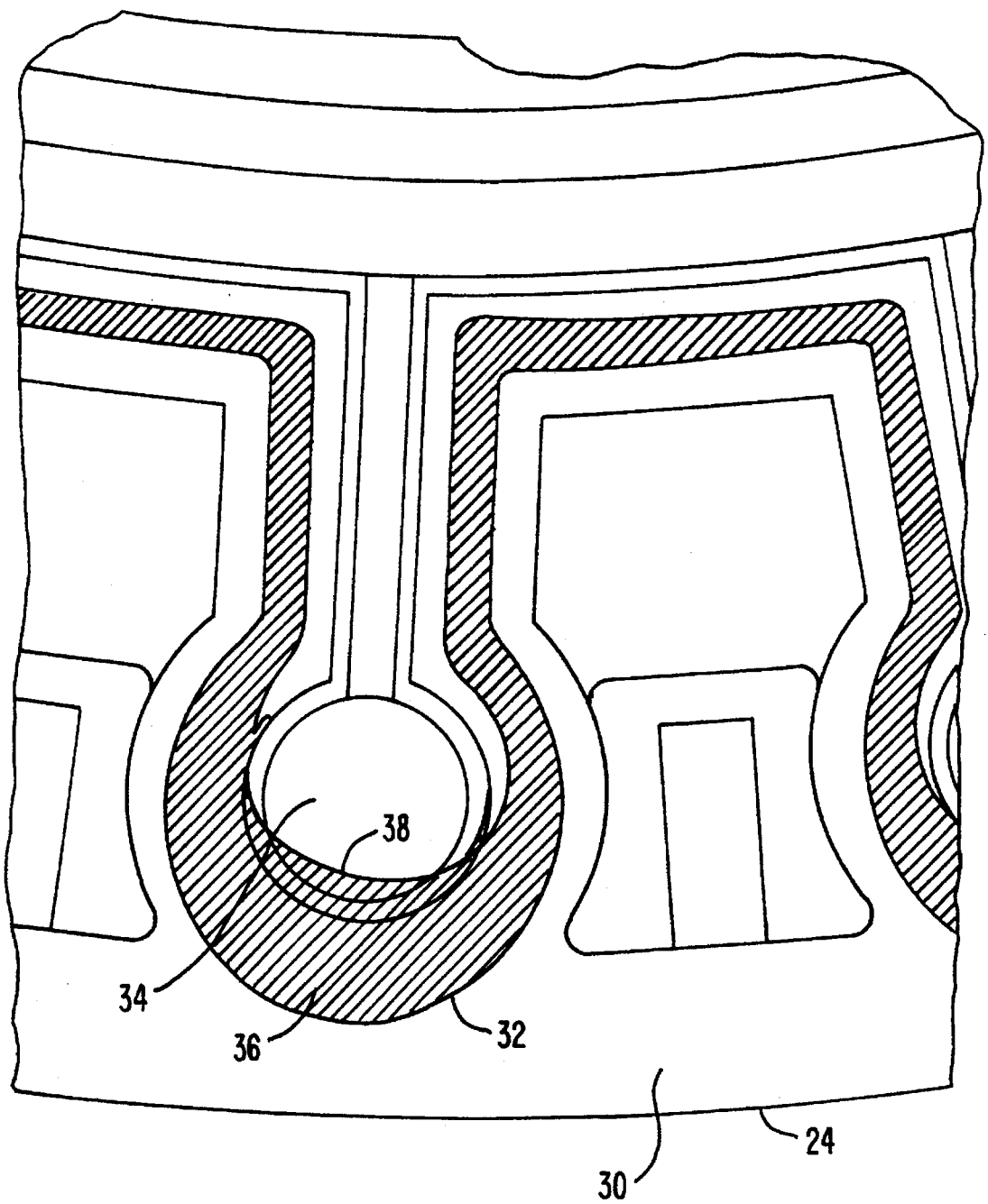
FIG. 4 is a detailed view of a prior art analytical rotor showing over-welding of the periphery and plastic flow into cuvettes which can occur in the absence of energy direction according to the present invention.
Figure 5:
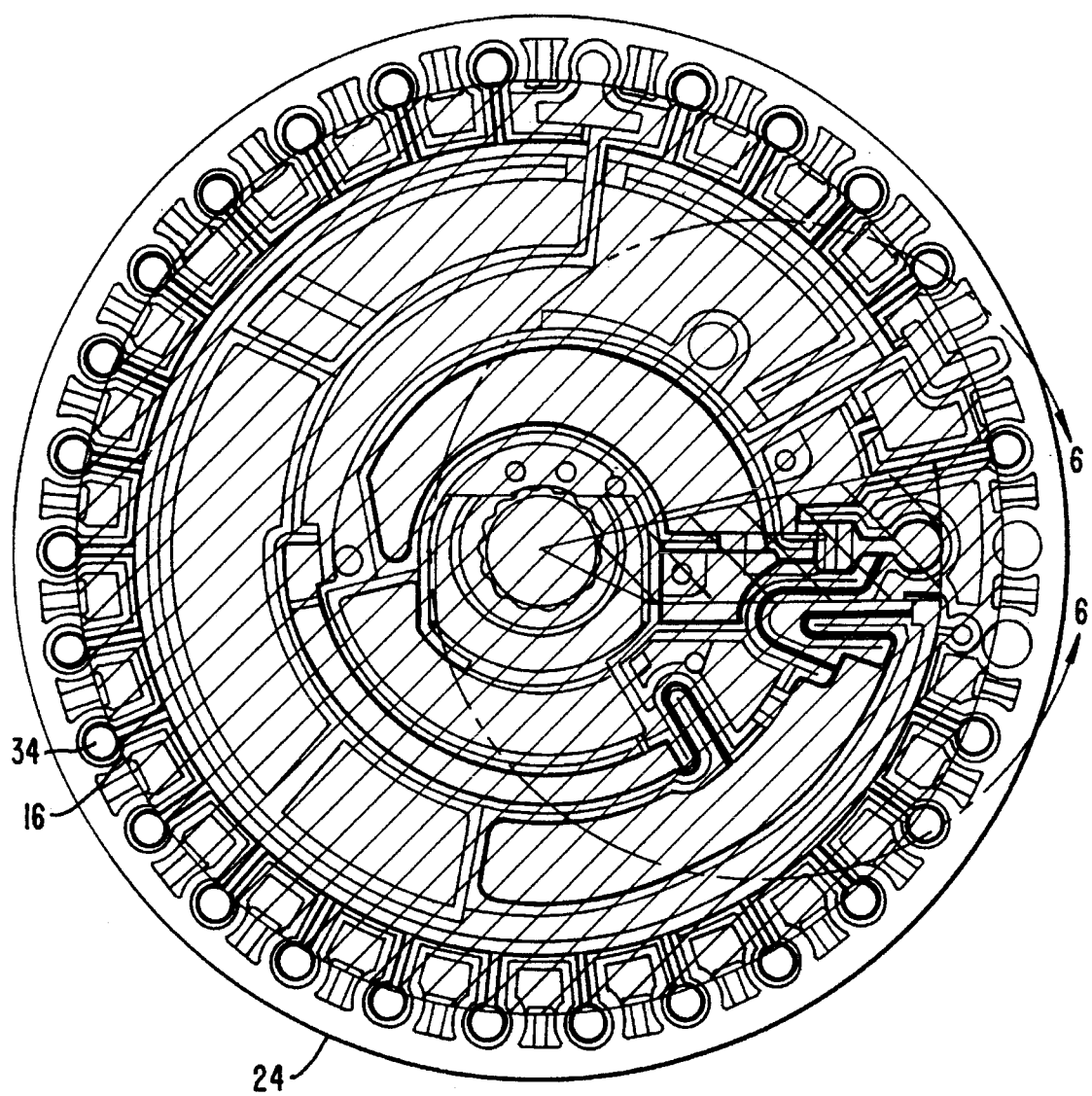
FIG. 5 is a plan view of a plastic film having two coplanar raised surfaces placed over an analytical rotor according to the present invention.

Along the periphery of the base 24 are a number of cuvettes 34. Using a flat welding horn the energy directors 32 surrounding the cuvettes 34 are over-welded, as illustrated in FIG. 4. Excess plastic 36 flows into the cuvettes 34, having an adverse impact on the effective light path length through the cuvette. To overcome this problem, the first coplanar region 16 is patterned to avoid contact with the peripheral areas which contain the cuvettes 34, as shown in FIG. 5.

Figure 6:
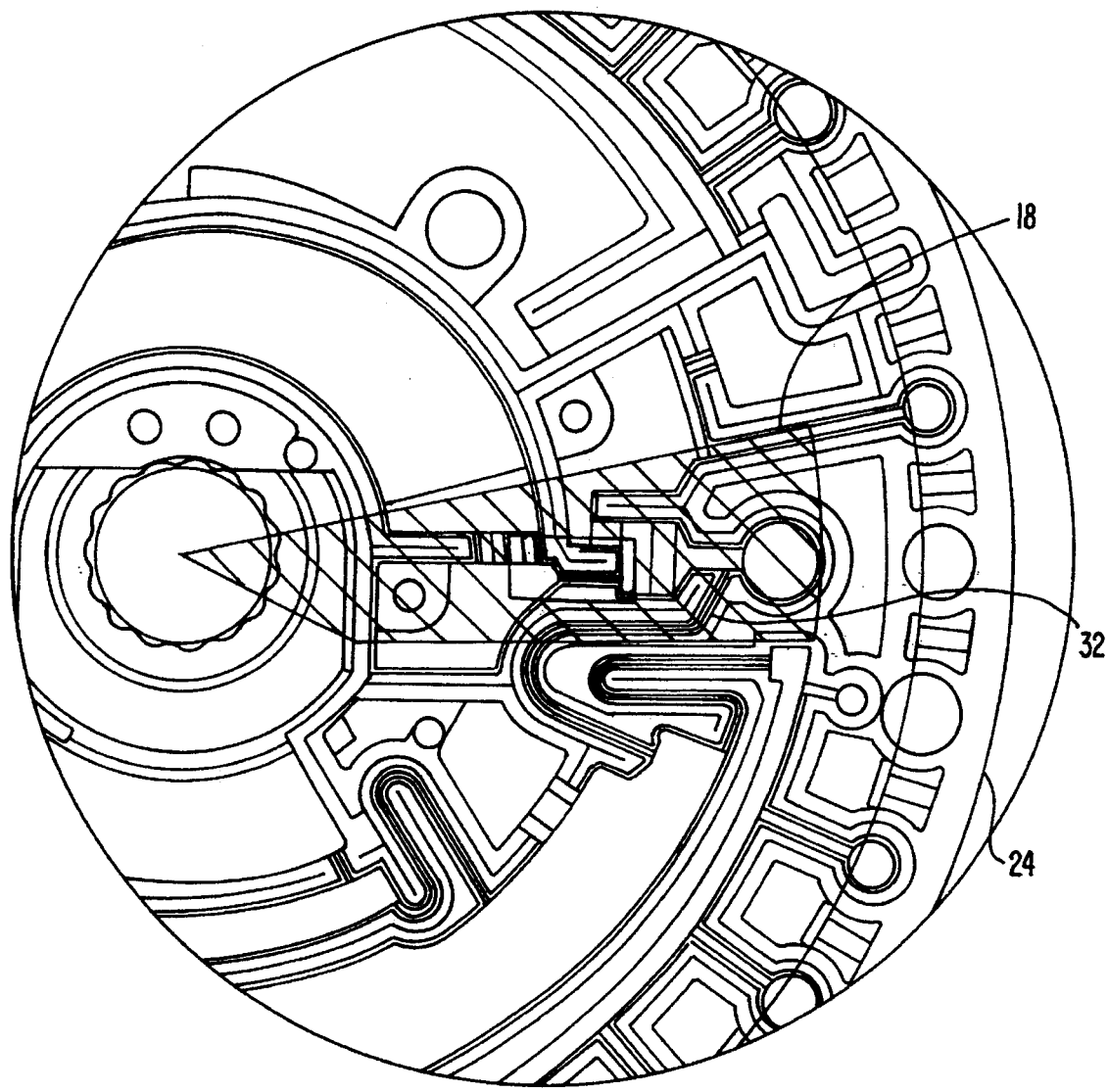
FIG. 6 is a detailed view of the raised second coplanar taken at line 6—6 in FIG. 5.

FIG. 6 shows a portion of the interior area of the base 24 where there is a high density of energy directors 32 and where under-welding often occurs. Consequently, the second coplanar region 18 is formed so that it is aligned with the area of the second thermoplastic part 24 having a high density of energy directors to enhance energy transfer in this area.

Referring again to FIG. 1, a nest 40 is used to hold the analytical rotor 20 in place while being ultrasonically welded. The nest 40 contains a cylindrical opening 42 in its center so that the bottom surface 31 of the second thermoplastic part 24 will sit in place while being welded to the first thermoplastic part 22. The nest 40 may be constructed in any manner so that the second thermoplastic part 24 will remain correctly positioned when ultrasonic energy and a compressive force is applied by the horn 10.

Still referring FIG. 1, the method for modifying the horn 10 to insure proper ultrasonic welding of an analytical rotor 20 is discussed. Initially, the cover 22 is placed on top of the base 22 so that the energy directors 32 of the top surface 30 of the base 24 are in contact with the bottom surface 28 of the cover 22. The "stacked" parts are then placed into the nest 40 so that the bottom surface 31 of the second thermoplastic part 24 fits into the cylindrical opening 42. The horn 10 is then lowered so that the energy-applying surface 14 contacts the top surface 26 of the first thermoplastic part 22. A compressive force in the range from 10 lbs. to 100 lbs. is then applied for a time in the range from 1 to 1000 msec. The ultrasonic vibration typically at about 20 kHz is then in initiated for a period in the range from 100 msec to 500 msec. While the horn 10 is vibrating, the compressive force is linearly increased to about 200 to 600 pounds. It should be appreciated that this combination of compressive force and ultrasonic vibration is not a set sequence and may be altered in any manner or any sequence in order to achieve the best results. After the horn 10 ceases to vibrate, it is held in place from about 0.5 to 2 sec. The horn 10 is raised and the welded analytical rotor 20 is examined to determine any areas that are either under-or over-welded. Typically, the areas around the cuvettes 34 are over-welded, and areas having a high density of energy directors are under-welded. From this information, the patterns of first coplanar region 16 and the second coplanar region 18 can be selected as discussed above to be attached to the energy-applying surface 14 of the horn 10.

After forming the correct geometries, the first coplanar region 16 and the second coplanar region 18 are applied to the energy-applying surface 14 by initially placing the second coplanar region 18 on the top surface 26 of the first thermoplastic part 22 covering the areas that are under-welded with the self-adhesive side facing away from the top surface 26 of the first thermoplastic part 22. The first coplanar region 16 is then placed on top of the second coplanar region 18 with its overlapping areas contacting the top surface 26 of the first thermoplastic part 22 with the adhesive side facing the energy applying surface 14 so that the outer diameter of the first coplanar region 16 is within the periphery of the cuvettes 34. The horn 10 is then lowered until the energy-applying surface 14 contacts the adhesive side of the first coplanar region 16. The horn 10 is then raised, and the first coplanar region 16 and the second coplanar region 18 are securely fastened to the energy-applying surface 14 as discussed above.

With the horn as modified, another analytical rotor 20 is welded according to the above process and is analyzed to determine if the desired welding has occurred. If not, the coplanar regions may be removed and replaced with new coplanar regions having altered geometries according to the process described above. This process is iterated until the desired weld occurs. Upon that event, analytic rotors 20 may be welded according to the above mentioned process.

It will be appreciated that the applied plastic film coplanar regions will eventually become ineffective due to overuse. In that event, the old coplanar regions can easily be manually removed and replaced with new ones by the above mentioned process.

Although the foregoing invention has been described in detail for purposes of clarity and understanding, it will be obvious that certain modifications may be practiced within the scope of the appended claims.

What is claimed is:

1. A method for joining a first thermoplastic workpiece to a second thermoplastic workpiece said method comprising the steps:

providing an ultrasonic horn comprising a resonant mass having an energy-applying surface with a planar base and at least one coplanar region raised relative to said base, wherein said region comprises a film and is raised from 0.0005 inches to 0.025 inches relative to said base;

disposing the two thermoplastic workpieces so that a pattern of energy directors on a surface of the second workpiece are in contact with a surface of the first workpiece;

contacting the energy-applying surface of the ultrasonic horn against one of the thermoplastic workpieces so that the raised region is generally disposed over the pattern of energy directors;

resonating the ultrasonic horn to deliver ultrasonic energy to the first workpiece for a time sufficient to melt thermoplastic material in each workpiece in said pattern of energy directors;

ceasing resonating the ultrasonic horn to allow the melted thermoplastic material in each workpiece to rigidify and form a weld.

2. A method as in claim 1, wherein the workpieces are contacted by placing the workpieces together between the energy-applying surface of the ultrasonic horn and a support surface and by applying a compressive force between the horn and support surface.

3. A method as in claim 2, wherein the compressive force is in the range from 200 lb/in$^2$ to 600 lb/in$^2$ and the ultrasonic energy is delivered from a time from 100 msec to 500 msec.

4. A method as in claim 1, wherein the raised coplanar region of the energy applying surface has a geometry which generally matches the geometry formed by the pattern of energy directors.

5. A method as in claim 4, wherein the energy applying surface further includes a second coplanar region which is raised a greater distance from the base than the first coplanar region and is positioned to contact areas with a high density of energy directors.

6. A method for joining a first thermoplastic workpiece to a second thermoplastic workpiece, said method comprising the steps:

providing an ultrasonic horn comprising a resonant mass having an energy-applying surface with a planar base and first coplanar region raised relative to said base, wherein said region is raised from 0.0005 inches to 0.025 inches relative to said base and a second coplanar region raised a different distance relative to said base;

disposing the two thermoplastic workpieces so that a pattern of energy directors on a surface of the second workpiece are in contact with a surface of the first workpiece wherein the pattern of energy directors includes a plurality of energy directors defining a region having a low density of energy directors and a region having a high density of energy directors;

contacting the energy-applying surface of the ultrasonic horn against one of the thermoplastic workpieces so that the first raised region is generally disposed over the region having the low density of energy directors and the second raised region is generally disposed over the region having the high density of energy directors;

ceasing resonating the ultrasonic horn to allow the melted thermoplastic material in each workpiece to rigidify and form a weld.

7. A method as in claim 6, wherein the workpieces are contacted by placing the workpieces together between the energy-applying surface of the ultrasonic horn and a support surface and by applying a compressive force between the horn and support surface.

8. A method as in claim 7, wherein the compressive force is in the range from 200 lb/in$^2$ to 600 lb/in$^2$ and the ultrasonic energy is delivered from a time from 100 msec to 500 msec.

9. A method for joining a first thermoplastic workpiece to a second thermoplastic workpiece said method comprising the steps:

providing an ultrasonic horn comprising a resonant mass having an energy-applying surface with a planar base and at least one coplanar region raised relative to said base, wherein said region is formed by etching and is raised from 0.0005 inches to 0.025 inches relative to said base;

disposing the two thermoplastic workpieces so that a pattern of energy directors on a surface of the second workpiece are in contact with a surface of the first workpiece;

contacting the energy-applying surface of the ultrasonic horn against one of the thermoplastic workpieces so that the raised region is generally disposed over the pattern of energy directors;

resonating the ultrasonic horn to deliver ultrasonic energy to the first workpiece for a time sufficient to melt thermoplastic material in each workpiece in said pattern of energy directors;

ceasing resonating the ultrasonic horn to allow the melted thermoplastic material in each workpiece in rigidify and form a weld.

10. A method for joining a first thermoplastic workpiece to a second thermoplastic workpiece said method comprising the steps:

providing an ultrasonic horn comprising a resonant mass having an energy-applying surface with a planar base and at least one coplanar region raised relative to said base, wherein said region is formed from a material which differs from the material of the energy applying surface and is raised from 0.0005 inches to 0.025 inches relative to said base;

disposing the two thermoplastic workpieces so that a pattern of energy directors on a surface of the second workpiece are in contact with a surface of the first workpiece;

contacting the energy-applying surface of the ultrasonic horn against one of the thermoplastic workpieces so that the raised region is generally disposed over the pattern of energy directors;

resonating the ultrasonic horn to deliver ultrasonic energy to the first workpiece for a time sufficient to melt thermoplastic material in each workpiece in said pattern of energy directors;

ceasing resonating the ultrasonic horn to allow the melted thermoplastic material in each workpiece to rigidify and form a weld.

* * * * *